Figure 1:
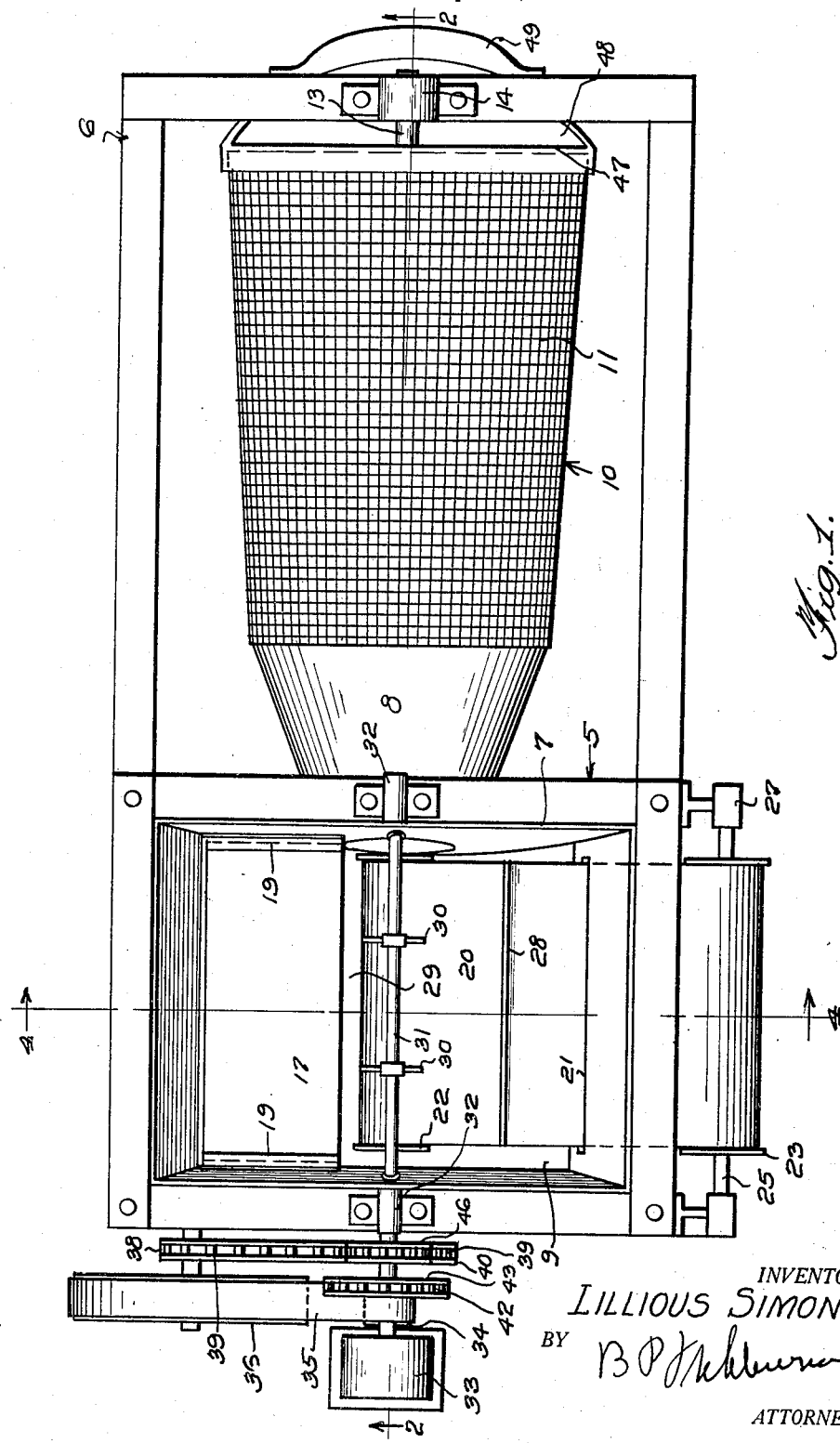

Sept. 15, 1931.  L. SIMONS  1,823,575
COTTON SEED CLEANER
Filed Sept. 3, 1930  3 Sheets-Sheet 1

INVENTOR.
LILLIOUS SIMONS,
BY
ATTORNEY.

Sept. 15, 1931.    L. SIMONS    1,823,575
COTTON SEED CLEANER
Filed Sept. 3, 1930    3 Sheets-Sheet 2
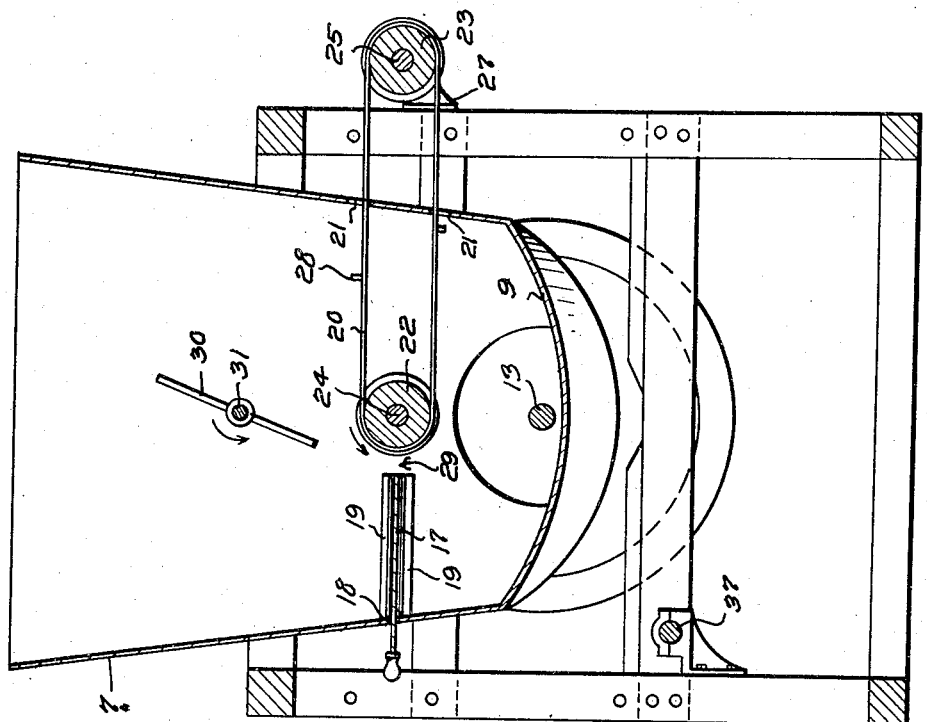
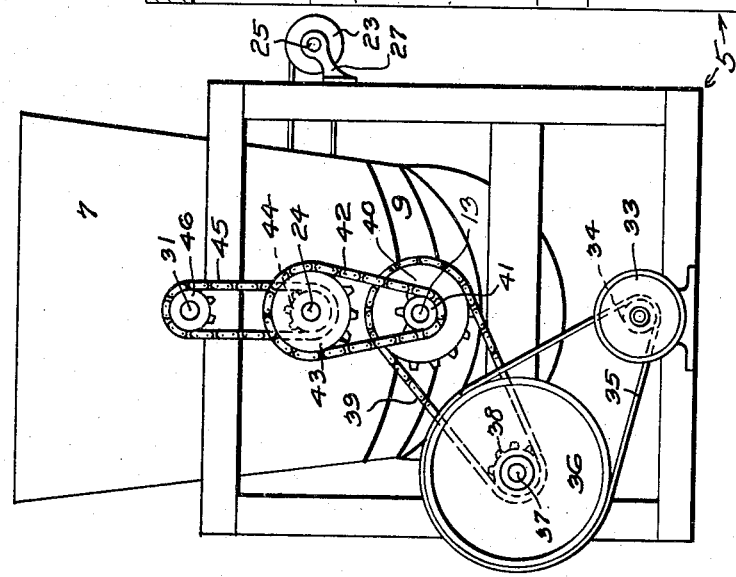
INVENTOR.
LILLIOUS SIMONS,
BY
ATTORNEY.

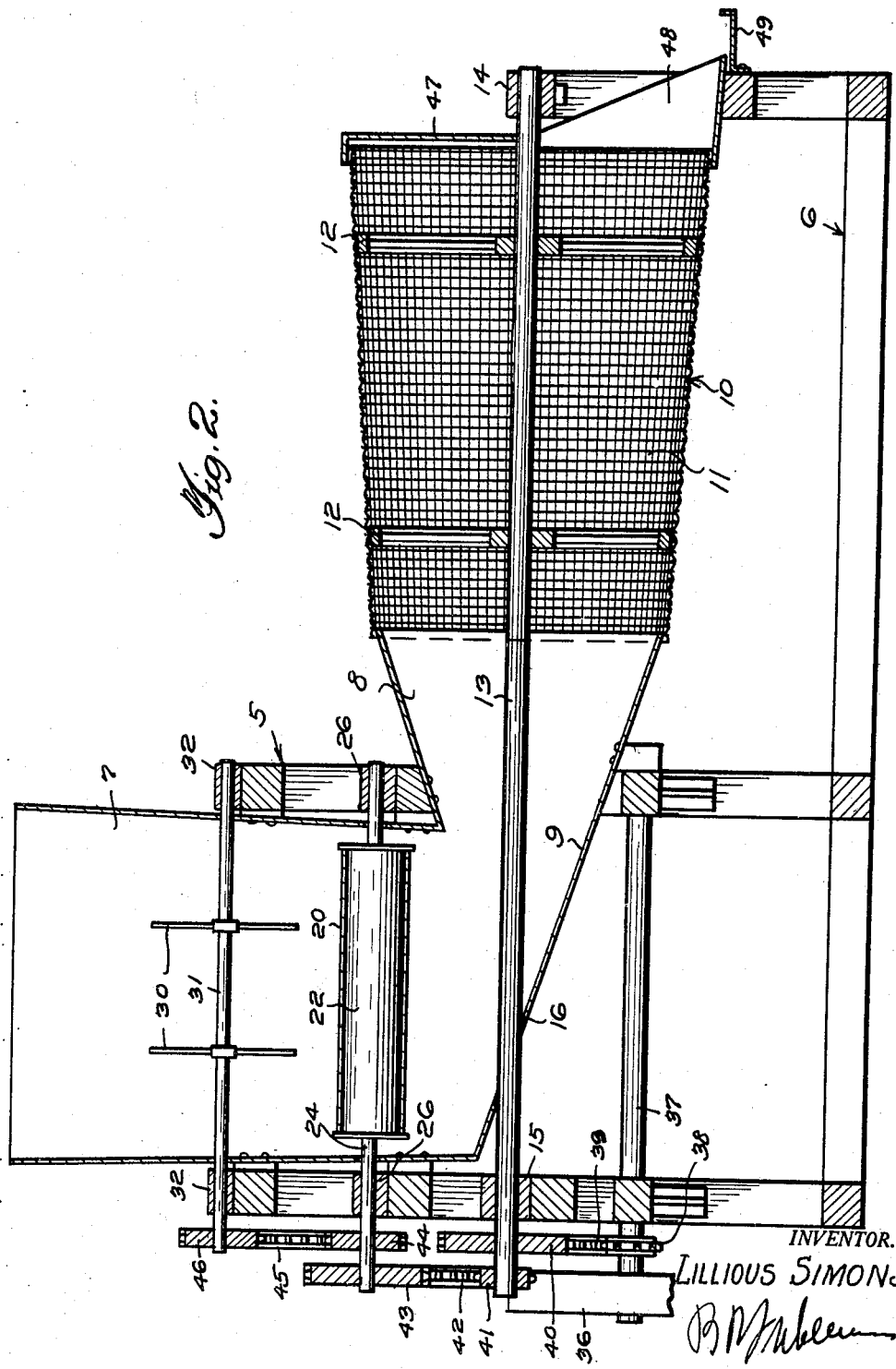

Patented Sept. 15, 1931

1,823,575

UNITED STATES PATENT OFFICE

LILLIUS SIMONS, OF SOCIAL CIRCLE, GEORGIA

COTTON SEED CLEANER

Application filed September 3, 1930. Serial No. 479,440.

My invention relates to improvements in cotton seed cleaners.

An important object of the invention is to provide apparatus of the above mentioned character which is adapted to thoroughly clean or separate out dirt, black seed, or the like, from the large seed, such apparatus operating in an efficient and continuous manner.

A further object of the invention is to provide means for feeding cotton seed from the hopper to the revolving screen drum, and in a properly regulated manner, and to prevent choking of the cotton seed within the hopper.

A further object of the invention is to provide an apparatus of the above mentioned character which is simple in construction, easy to operate, and cheap to manufacture.

Other objects and advantages of the invention will be apparent during the course of the following description.

In the accompanying drawings, forming a part of this specification, and in which like numerals are employed to designate like parts throughout the same, Figure 1 is a plan view of a cotton seed cleaner embodying my invention, Figure 2 is a central vertical longitudinal section taken on line 2—2 of Figure 1, Figure 3 is a front end elevation of the same, and, Figure 4 is a transverse section taken on line 4—4 of Figure 1.

In the drawings, wherein for the purpose of illustration, is shown a preferred embodiment of my invention, the numeral 5 designates a vertical frame, preferably formed of wood, having connection with a horizontal frame 6.

Suitably mounted within the upper portion of the vertical frame 5 is a stationary hopper 7, which is slightly tapered, decreasing in width downwardly. This hopper discharges at its bottom into a horizontally arranged chute 8, having an inclined bottom 9, as shown. The chute 8 is longitudinally tapered and increases in diameter toward a rotary drum 10, as shown.

This rotary drum embodies a foraminous casing 11, which may be formed of perforated sheet metal, wire fabric, or the like, having a suitable degree of stiffness. I have found that satisfactory results are obtainable by using a wire fabric of 9 mesh to the square inch. The foraminous casing or drum 11 is circular in cross section and increases in diameter toward its discharge end, and has its axis of rotation arranged horizontally. The drum 11 is supported by spiders 12, arranged therein and rigidly secured thereto, and these spiders are rigidly mounted upon a horizontal shaft 13, journaled in bearings 14 and 15. The shaft 13 extends through an opening 16 in the bottom 9 of the chute 8.

As more clearly shown in Figure 4, the bottom 9 of the chute 8 is not only longitudinally inclined downwardly toward the drum 11, but is transversely concave or inclined toward its longitudinal center. Means are provided within the lower portion of the hopper and operating above and spaced from the bottom 9, to feed the cotton seed in a regulated manner in the chute 8. This means comprises a horizontally arranged adjustable cut-off plate or valve 17, projecting through an opening 18, and slidably supported between pairs of horizontal guide bars 19. This slide plate is disposed in end-to-end relation to a horizontal feeding and agitating endless belt 20, operating through openings 21, and engaging over rollers 22 and 23. The roller 22 is rigidly mounted upon a horizontal shaft 24, while roller 23 is rigidly mounted upon a horizontal shaft 25. The shaft 24 is journaled in bearings 26, Figure 2, while the shaft 25 is journaled in bearings 27. The shafts 24 and 25 are disposed in the same horizontal plane and the slide plate 17 is in alignment with the axis of rotation of these shafts. The endless belt 20 carries transverse agitating ribs 28, projecting outwardly therefrom and these ribs pass through the openings 21 during their travel. There is a space 29 between the slide plate 17 and the end of the endless belt, and the agitating and feeding ribs 28 are adapted to pass through this space, and the width of this space may be varied by adjusting the slide plate 17. The endless belt 20 is driven so that its upper run travels toward the feeding space or opening 29. The ribs 28 serve to feed the cotton seed into and through the space or opening 29 and also agitate the mass within the hopper above the endless belt.

Rotary agitators 30 are disposed within the hopper 7 near and spaced from the endless belt 20 and are located at the central longitudinal axis of the hopper and are rigidly mounted upon a horizontal shaft 31, journaled in bearings 32.

The numeral 33 designates a prime mover, such as an electric motor, driving a pulley 34, carrying a belt 35, engaging and driving a larger pulley 36, which is rigidly mounted upon a horizontal shaft 37. The shaft 37 is equipped with a small sprocket wheel 38, engaged by a sprocket chain 39, engaging a sprocket wheel 40, which is rigidly mounted upon the screen drum shaft 13. The shaft 13 carries a small sprocket wheel 41, rigidly mounted thereon, engaging a sprocket chain 42, extending upwardly to engage a larger sprocket wheel 43, which is rigidly mounted upon the shaft 24. The shaft 24 carries a sprocket wheel 44, rigidly mounted thereon, driving a sprocket chain 45, engaging a sprocket wheel 46, rigidly mounted upon the shaft 31.

The numeral 47 designates a stationary cover plate at the rear or outlet end of the drum 10 and this cover plate is provided in its bottom with an outlet chute 48, to discharge the screened or selected seed to a bag supported by a bag holder 49.

The operation of the apparatus is as follows:

The screen drum 10 is preferably rotated at about 35 to 40 R. P. M. The endless belt is driven slowly, by virtue of the speed reducing gearing between the same and the shaft 13. The rotary agitators 30 are rotated at about the same speed as the endless belt. It is desired that the cotton seed be fed in regulated amounts into the chute 8, to prevent overloading of the screen drum. This is accomplished by adjusting the slide plate 17, with respect to the endless belt 20. The ribs 28 positively feed the cotton seed through the space 29 and also aid in agitating the cotton seed within the hopper, and this agitation is also aided by the rotary agitators 30. As the cotton seed travels longitudinally through the drum 10 it is agitated and the dirt, black seed, small seed, etc., pass through the foraminous drum, while the large seed discharge through the chute 48.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:—

1. In a cotton seed cleaner, a support, a generally horizontal foraminous drum mounted upon the support, a hopper mounted upon the support, a generally horizontal feed belt operating within the lower portion of the hopper, means arranged near the discharge end of the belt, and forming therewith a feed passage, a rotary agitator arranged within the hopper near and above the feed belt, means to drive the belt so that its upper run travels toward the passage forming means, means to rotate the drum, means to rotate the agitator so that it turns toward the discharge end of the belt, and a chute having a bottom which is inclined downwardly toward the drum to feed the divided cotton seed mass to the drum by gravity, the said bottom of the chute being disposed beneath and spaced from the feed belt.

2. In a cotton seed cleaner, a support, a generally horizontal foraminous drum mounted upon the support, a hopper mounted upon the support, said hopper having openings in the lower portion of its side, a generally horizontal feed belt having its upper and lower runs extending through said opening and having transverse agitating bars, said belt extending interiorly and exteriorly of the hopper near its bottom, a generally horizontal adjustable slide plate extending into the hopper and arranged near the discharge end of the belt and forming a contracted passage therewith, the width of the passage being varied by adjusting the slide plate, a rotary agitator within the hopper above the belt, means to drive the belt so that its discharge end travels downwardly through the passage, means to rotate the drum, and a chute having an inclined bottom extending downwardly toward the drum to feed the divided cotton seed mass to the drum, said inclined bottom of the chute being arranged beneath and spaced from the feed belt.

3. In a cotton seed cleaner, a support, a generally horizontal shaft mounted upon the support, a foraminous drum carried by the shaft to rotate therewith, a hopper mounted upon the support, said hopper being provided in its side with openings, a generally horizontal belt shaft mounted upon the support and extending to the lower portion of the hopper above the drum shaft, a second generally horizontal belt shaft mounted upon the support exteriorly of the hopper, rollers carried by the belt shafts, an endless feed belt mounted upon the rollers and extending through said openings and having agitating ribs, a slide plate extending through the opposite side of the hopper and arranged near the discharge end of the belt for forming a downwardly discharging contracted passage, a rotary agitator arranged within the hopper above the endless belt, gearing connecting the inner belt shaft and the agitator so that they turn in the same direction, gearing connecting the inner belt shaft and the drum shaft, means to drive the drum shaft so that the inner belt shaft is turned in a direction to cause the upper run to travel toward the slide plate, and a chute having an inclined bottom extending downwardly toward the drum to feed the divided cotton seed mass to the drum, said bottom of the chute being arranged beneath and spaced from the downwardly discharging contracted passage whereby the divided cotton seed mass drops upon said inclined bottom.

In testimony whereof I affix my signature.

LILLIUS SIMONS.